DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 6

T938,001

HIGH-ANALYSIS NITROGEN-PHOSPHORUS COMPOUNDS AND METHODS FOR THEIR PREPARATION

Kjell R. Waerstad, Colbert Height, 35674, and Guerry H. McClellan, Box 212, Rte. 1 35645, both of Killen, Ala.

Filed May 14, 1973, Ser. No. 360,102
Int. Cl. C05b *15/00*
U.S. Cl. 71—29
1 Sheet Drawing. 23 Pages Specification

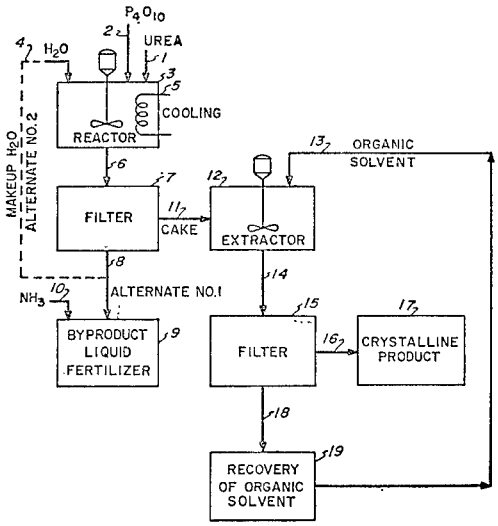

New compositions of matter have been prepared by reaction of urea with the hydrolysis products of phosphoric oxide. Among the new salts are the crystalline adducts of urea with tetrametaphosphoric acid and long-chain polyphosphoric acid. Adducts of urea with polyphosphoric acids with short and intermediate chain lengths are amorphous. When the urea tetrametaphosphoric acid adduct is dissolved in an aqueous ammonium hydroxide solution, a product of ammonium tetrametaphosphate and urea can be recovered by evaporation of the aqueous phase or by addition of alcohol. A new polymorphic modification of ammonium tetrametaphosphate has been prepared in this way. In addition, a new polymorph of long-chain ammonium polyphosphate has been prepared by pyrolysis of the urea tetrametaphosphoric acid adduct.

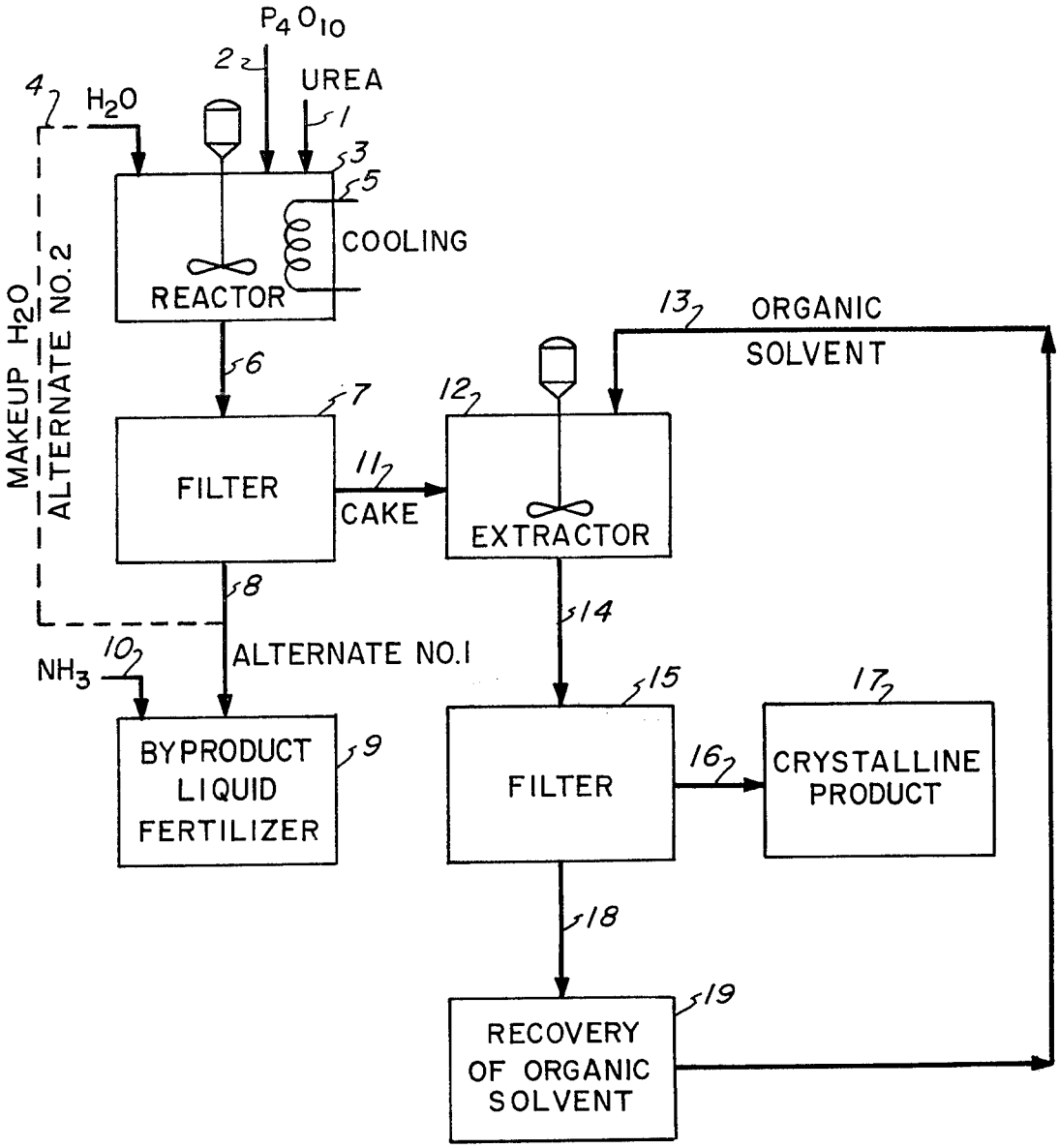

HIGH-ANALYSIS NITROGEN-PHOSPHORUS COMPOUNDS
AND METHODS FOR THEIR PREPARATION
Filed May 14, 1973